(12) United States Patent
Jeong

(10) Patent No.: US 7,207,833 B2
(45) Date of Patent: Apr. 24, 2007

(54) APPARATUS FOR ADJUSTING LENGTH OF A WIRE HARNESS IN THE VEHICLE SEAT

(75) Inventor: Taek Soo Jeong, Incheon (KR)

(73) Assignee: Hyundai Motor Company and Kia Motors Corporation, Seocho-Ku, Seoul (KR)

( * ) Notice: Subject to any disclaimer, the term of this patent is extended or adjusted under 35 U.S.C. 154(b) by 211 days.

(21) Appl. No.: 11/023,699

(22) Filed: Dec. 27, 2004

(65) Prior Publication Data

US 2006/0084293 A1    Apr. 20, 2006

(30) Foreign Application Priority Data

Oct. 19, 2004    (KR) ...................... 10-2004-0083652

(51) Int. Cl.
*H01R 13/72*    (2006.01)
*A47C 1/00*    (2006.01)

(52) U.S. Cl. ...................................... 439/501; 297/341

(58) Field of Classification Search ................ 439/501, 439/502, 506; 297/341, 340, 342, 343; 248/393, 248/396, 397, 429
See application file for complete search history.

(56) References Cited

U.S. PATENT DOCUMENTS

| | | | | |
|---|---|---|---|---|
| 4,101,169 A | * | 7/1978 | Muraishi et al. | ............. 297/341 |
| 4,304,386 A | * | 12/1981 | Nagashima et al. | ......... 248/429 |
| 4,484,776 A | * | 11/1984 | Gokimoto et al. | ....... 296/65.09 |
| 4,497,518 A | * | 2/1985 | Nishimura et al. | ......... 297/341 |
| 5,800,015 A | * | 9/1998 | Tsuchiya et al. | ............ 297/331 |
| 5,944,383 A | * | 8/1999 | Mathey et al. | .............. 297/341 |
| 6,523,892 B1 | * | 2/2003 | Kage et al. | ............ 297/216.13 |

* cited by examiner

*Primary Examiner*—Chandrika Prasad
(74) *Attorney, Agent, or Firm*—Morgan Lewis & Bockius LLP

(57) ABSTRACT

An apparatus for adjusting the length of a wire harness in a vehicle seat prevents seat slides from being trapped in the neighboring parts of the seat during movement of the seat along a fore-aft direction. Thereby, the safety to passengers in the vehicle is greatly increased. A spring, engaged on its external side by a seat wire harness and its inner end by a restraining jaw, is housed in a seat wire harness cover. The spring is allowed to rotate on an axis by the restraining jaw being constrained in movement to rotation about the axis.

4 Claims, 4 Drawing Sheets

APPARATUS FOR ADJUSTING LENGTH OF A WIRE HARNESS IN THE VEHICLE SEAT

CROSS REFERENCE TO RELATED APPLICATION

This application is based on, and claims priority to Korean Patent Application No. 2004-83652, filed on Oct. 19, 2004, the disclosure of which is hereby incorporated by reference.

TECHNICAL FIELD OF THE INVENTION

The present invention generally relates to an apparatus for adjusting the length of a wire harness in a vehicle seat. More particularly the apparatus adjusts the length of a wire harness in a vehicle seat which can greatly increase the safety of passengers in a vehicle.

BACKGROUND OF THE INVENTION

Typically, the lower parts of vehicle seats are provided with various lines including wire harnesses which are rather complicated in their arrangement. The conventional wire harness apparatus in a vehicle seat is fixed to one end of a vehicle seat with a buckle to operate the seat wire harness while the seat wire harness is fixed to a connector. The connector is connected to the surface beneath a seat slide, thereby being fixed to a feed fixing member of the seat slide located on the other end. Upon operation of the seat belt buckle, the seat belt buckle and the feed fixing member are released from the seat slides through the seat wire harness. Therefore, the seat can be fed in the fore-aft direction as a result. The connector is fixed to the lower part of the seat slide and the feed fixing member, located at the other end, moves along the fore-aft direction. Further, the seat wire harness should secure a sufficient length considering the distance being fed by the feed fixing member.

Therefore, upon operation of the seat belt buckle the fixing member becomes released from the seat slides and fed along with the seat wire harness. The seat wire harness, with a sufficient length, is trapped with neighboring parts, thereby, causing breaking or malfunctioning of the seat wire harness. More specifically, it may raise a more serious problem when it is related to the safety of passengers such as a seat belt wire or an airbag wire.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

According to an embodiment of the present invention, an apparatus is provided that can properly adjust the length of a seat wire harness and maintained within a range to be suitable for the operation of a vehicle seat.

According to an embodiment of the present invention, the invention provides an apparatus for adjusting the length of the seat wire harness in a vehicle seat which can greatly increase the safety of passengers in a vehicle. More particularly, the apparatus adjusts the length of the seat wire harness in a vehicle seat when the seat moves along the fore-aft direction by means of a cushion panel having a panel hole disposed beneath a vehicle seat. The apparatus includes a fixing member, wherein a circular recess is provided in the rotational shaft, which is again connected to the panel hole and its lower part, respectively, and a fixed jaw is provided at the inner part of the circular recess. A fixing hinge having a restrained jaw formed at its lower part while its upper part is connected to the circular recess in the fixing member. A spiral spring that undergoes compression and expansion as being fixed to the restrained jaw of the fixing hinge. A seat wire harness installed as it is wound about the external surface of the spiral spring. Also, a seat wire harness cover wherein the seat wire harness and the spiral spring are installed at the inner side thereof.

BRIEF DESCRIPTION OF THE DRAWINGS

The aforementioned aspect and other features of the present invention will be explained in the following detailed description, taken in conjunction with the accompanying drawings, wherein.

DETAILED DESCRIPTION OF THE INVENTION

Figure 1:
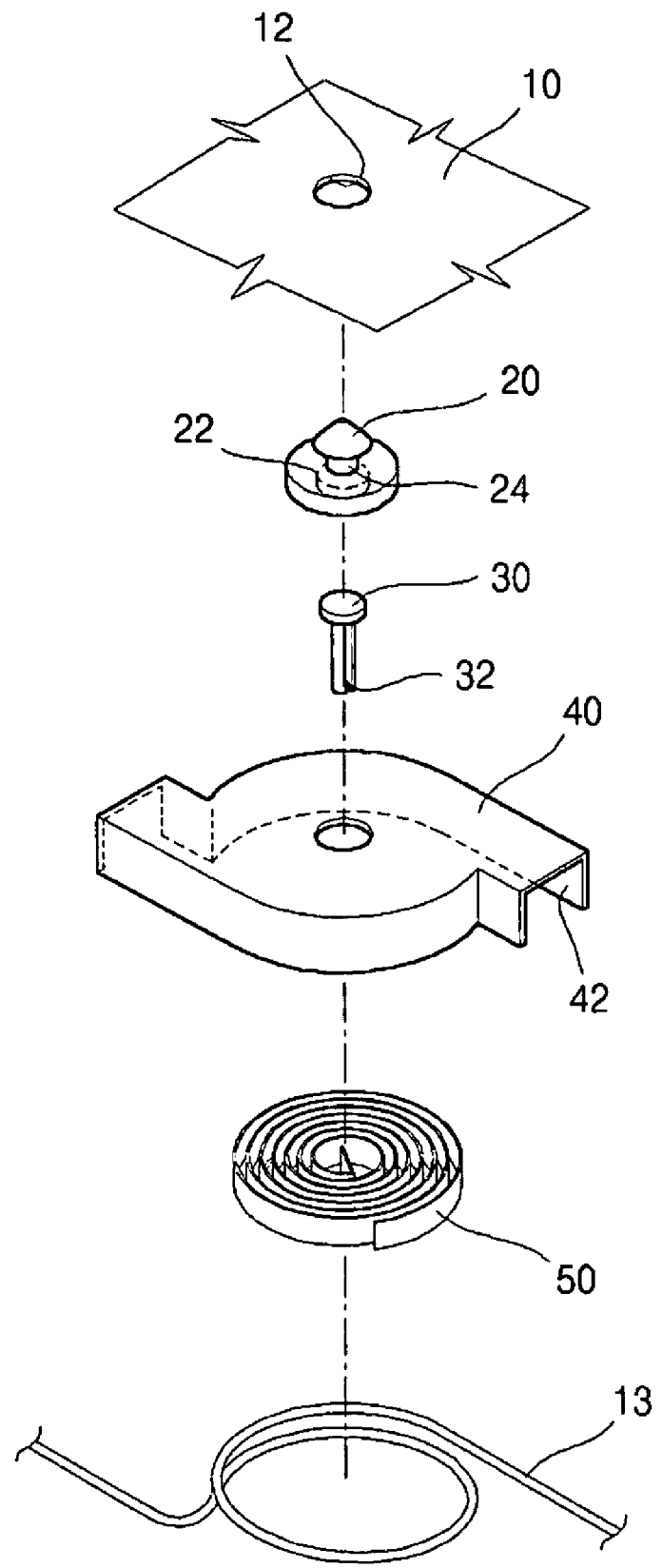
FIG. 1 is an exploded perspective view of the apparatus for adjusting the length of the seat wire harness according to an embodiment of the present invention.

According to FIG. 1 apparatus for adjusting the length of the seat wire harness is assembled in such a manner that a fixing member 20 with a rotational shaft 24 is connected to a panel hole 12 of a cushion panel 10. A fixing hinge 30 is connected to a circular recess 22, which is formed at a lower part of the above fixing member 20. A spiral spring 50 is connected to a lower part of the fixing hinge 30 by means of a restrained jaw 32. The seat wire harness is wound around the external surface 52 of the spiral spring 50 and the spiral spring 50 is disposed at the inner side of the seat wire harness cover 40. The fixing member 20 is capable of rotating 360 degrees due to the presence of the rotational shaft 24 which is connected to the panel hole 12, thereby preventing the twisting of the seat wire harness 13.

Figure 2:
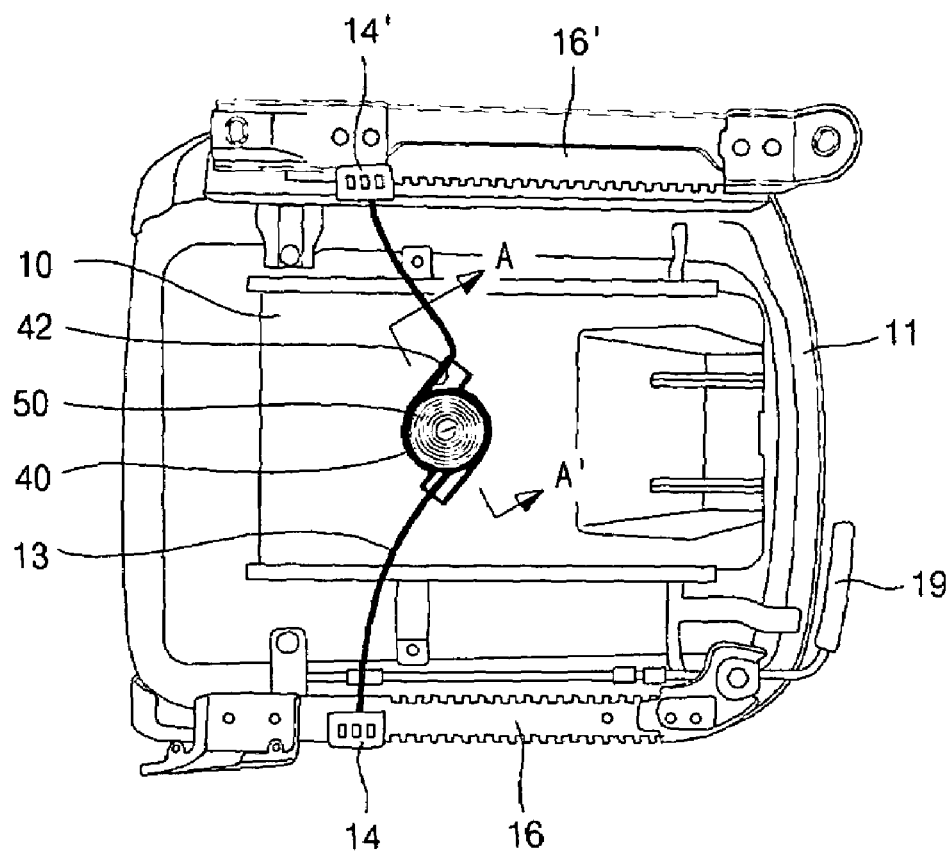
FIG. 2 is a bottom view of the apparatus for adjusting the length of the seat wire harness according to an embodiment of the present invention.
Figure 3:
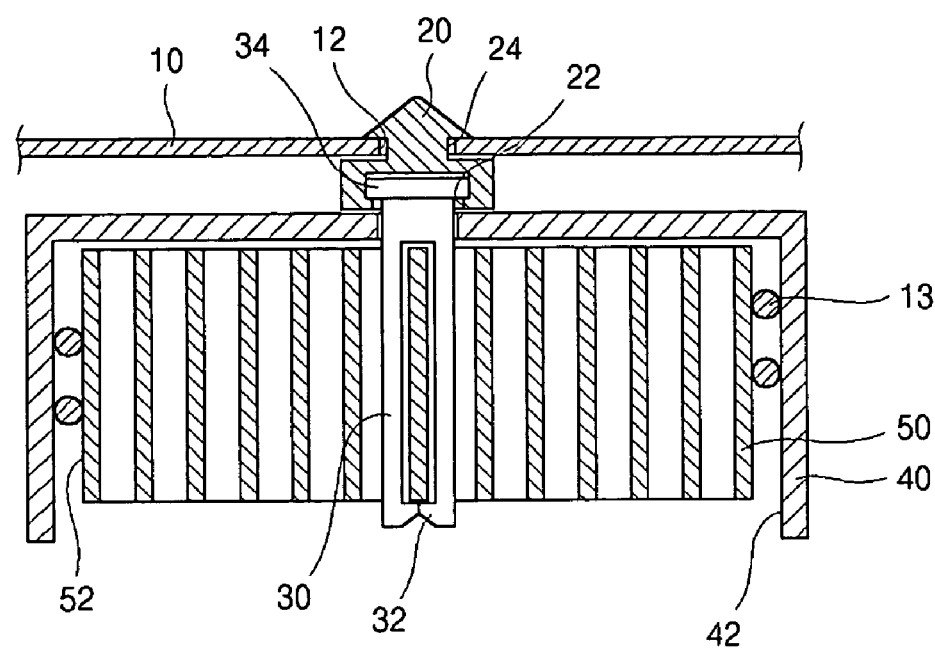
FIG. 3 is a cross-sectional view of FIG. 2 along line A–A'.

Referring to FIG. 2, the apparatus that adjusts the length of the seat wire harness if fixed in the center of the cushion panel 10 located beneath the seat 11. Thereby, connecting the seat wire harness 13 to the feed fixing members 14, 14' located on either side of the seat 11. Upon operation of the feed knob 19, the feed fixing members 14, 14' are released from the seat slides 16, 16' and fed along the fore-aft direction. Therefore, the fixing member 20 having the rotational shaft 24, as shown in FIG. 3, is capable of rotating by being connected to the panel hole 12. Further, a circular recess 22 is formed at a lower part of the fixing member 20 to insert the upper part of the fixing hinge 30 into the fixed jaw, thereby being engaged with the inner side of the circular recess 12.

Figure 4:
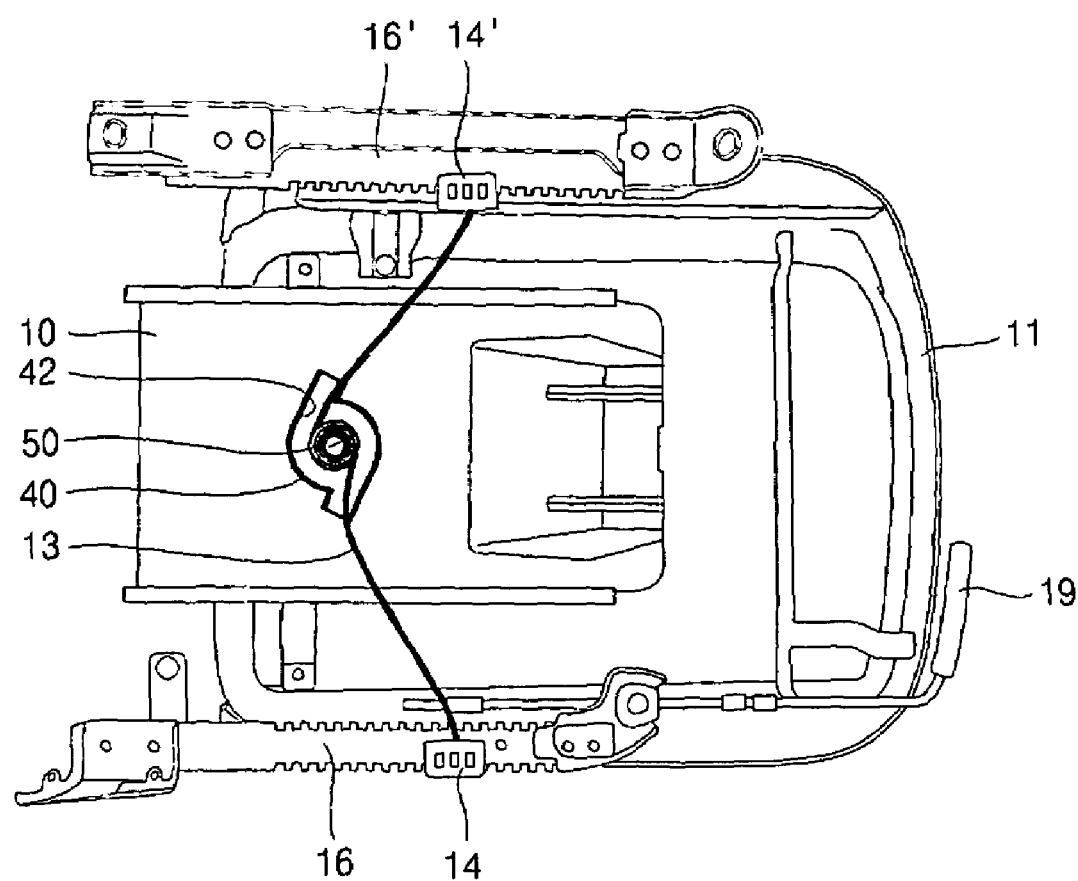
FIG. 4 is a bottom view of the apparatus for adjusting the length of the seat wire harness, the seat being in a state of movement, according to an embodiment of the present invention.

Further, a restrained jaw 32 is formed at the lower part of the fixing hinge 30 thereby connecting the seat wire harness cover 40 to the fixing hinge 30. It also prevents the detachment of the seat wire harness cover 40 and the spiral spring 50, which are connected via the spiral spring 50, which passes through the restrained jaw 32. That is, as shown in FIG. 4, upon operation of the feed knob 19, the feed fixing members 14, 14' are released from the seat slides 16, 16'. When the above seat 11 is fed, the seat wire harness 13 compresses the spiral spring 50 as much as the distance fed by the seat 11 and thus increases the length of the seat wire harness.

Furthermore, in the event that the seat slide 16 is not under operation, the spiral spring 50 becomes expanded which in turn pushes the seat wire harness 13, which is wound around the spiral spring 50, into the inner side of the seat wire harness cover 40, thereby drooping the seat wire harness 13.

Even though the present invention is described in detail with reference to the foregoing embodiments, it is not intended to limit the scope of the present invention thereto. It is evident from the foregoing that many variations and modifications may be made by a person having an ordinary skill in the present field without departing from the essential concept of the present invention.

What is claimed is:

1. An apparatus for adjusting a length of a seat wire harness in a vehicle seat moving along a fore-aft direction by means of a cushion panel having a panel hole disposed beneath a vehicle seat, the apparatus comprising:
    a fixing member, comprising a circular recess, wherein fixed jaw is provided at the an inner part of the circular recess, fixing member further comprising a rotational shaft at a lower part of the fixing member, the rotational shaft being connected to the panel hole;
    a fixing hinge having a restrained jaw formed at its lower part while its upper part is, connected to the circular recess in the fixing member;
    a spiral spring that undergoes compression and expansion as being fixed to the restrained jaw of the fixing hinge;
    the seat wire harness wound about the external surface of the spiral spring; and
    a seat wire harness cover wherein the seat wire harness and the spiral spring are installed at the inner side thereof.

2. The apparatus according to claim 1, wherein said fixing member is capable of rotating 360 degrees due to the rotational shaft connected to said panel hole.

3. An apparatus for adjusting a length of a seat wire harness in a vehicle seat, comprising:
    a fixing member defining an axis of rotation and a circular recess, both the axis and recess are configured about a longitudinal axis of rotation of the fixing member;
    a panel defining a panel hole, the panel hole being configured and dimensioned to receive the fixing member;
    a fixing hinge having a first portion configured to be coupled with the circular recess and a second portion configured as a restraining jaw;
    a spring configured at one end to be coupled with the restraining jaw;
    the seat wire harness having a portion thereof configured and dimensioned to be positioned about an external surface of the spring; and
    a seat wire harness cover configured and dimensioned to be positioned around the spring and portion of the seat wire harness positioned about the spring.

4. The apparatus of claim 3, wherein the fixing member is capable of rotating 360 degrees about the axis of rotation while being coupled within the panel hole.

* * * * *